United States Patent [19]

Kisiel, III

[11] 4,445,714
[45] May 1, 1984

[54] COMPRESSION END PIPE COUPLING FOR PLASTIC PIPE

[75] Inventor: Stanley C. Kisiel, III, Bradford, Pa.

[73] Assignee: Dresser Industries, Inc., Dallas, Tex.

[21] Appl. No.: 361,326

[22] Filed: Mar. 25, 1982

[51] Int. Cl.³ .............................................. F16L 55/00
[52] U.S. Cl. ..................................... 285/23; 285/323; 285/423
[58] Field of Search ............... 285/323, 249, 423, 250, 285/23, 342

[56] References Cited

U.S. PATENT DOCUMENTS

| 2,457,648 | 12/1940 | Donner | 285/323 |
| 2,779,610 | 0/1957 | Risley | 285/323 |
| 3,756,632 | 9/1973 | Riggs et al. | 285/250 |
| 4,107,452 | 8/1978 | Razvi | 285/323 X |
| 4,138,145 | 2/1979 | Lawrence | 285/323 X |
| 4,229,025 | 0/1980 | Volgstadt et al. | 285/105 |

FOREIGN PATENT DOCUMENTS

| 271367 | 5/1964 | Australia | 285/323 |
| 1072028 | 12/1959 | Fed. Rep. of Germany | 285/250 |
| 801859 | 9/1958 | United Kingdom | 285/250 |

Primary Examiner—Dave W. Arola
Attorney, Agent, or Firm—Daniel Rubin

[57] ABSTRACT

A tubular body includes an enlarged counterbore extending inward from at least one end to receive the pipe end of plastic pipe to be coupled. For coupling the received pipe, a tubular stiffener is seated against an inward radial shoulder of the counterbore and extends in a slip fit inward of the pipe end. A spacer retainer ring of generally U-shaped section surrounds the pipe end at the shoulder location while juxtaposed outward thereof are a complementary chamferred gripper ring and locking ring arranged in a ramping relation to each other. Inward threading of an end nut applies sealing pressure against a contained gasket while forcing the locking ring axially inward until stopped by engagement against the back face of the spacer ring. Concomitantly, the gripper ring is collapsed inward by the ramping force of the locking ring as to effect a controlled grip relation with the pipe periphery thereat.

3 Claims, 8 Drawing Figures

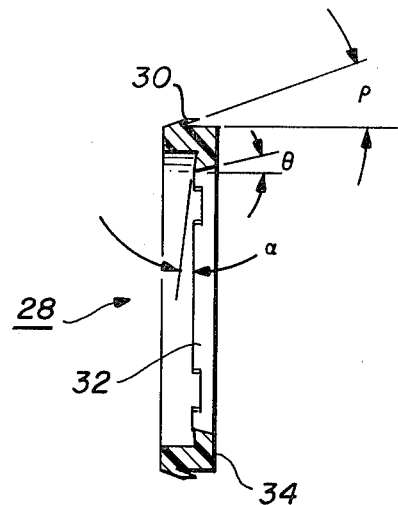
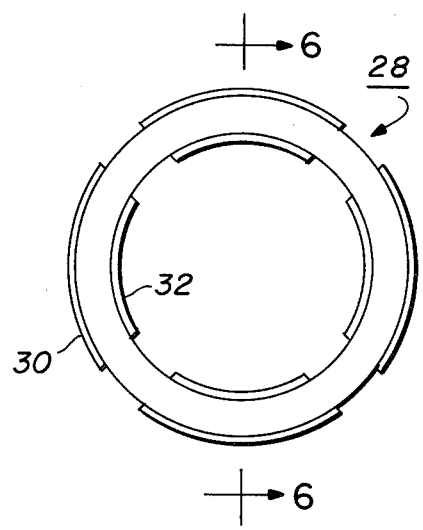
FIG. 6       FIG. 5
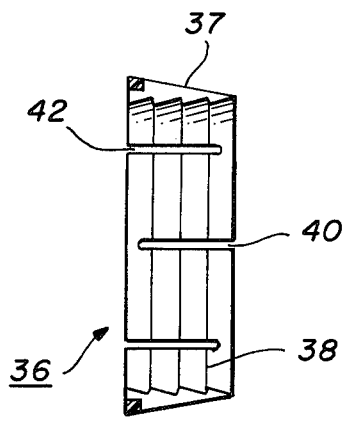
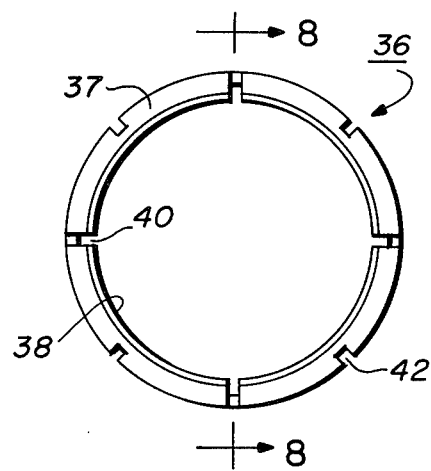
FIG. 8       FIG. 7

COMPRESSION END PIPE COUPLING FOR PLASTIC PIPE

TECHNICAL FIELD

The field of art to which the invention pertains includes the art of pipe joints and pipe couplings.

BACKGROUND OF THE INVENTION

Pipe couplings are commercially available from a variety of manufacturing sources and are used extensively for underground piping installations. It is known in such couplings to employ gripping members of sorts, in order to prevent in-service uncoupling of the joint by longitudinal drawbar forces imposed on the coupled pipe section.

With the advent of plastic pipe and tubing and their approval by regulating governmental agencies for natural gas transmission, the previous problem of pipe pullout from a coupled joint has increased many times over to on the order of ten fold as compared to metal pipe. One factor most contributing to this problem is the much greater linear coefficient of thermal expansion for plastic pipe as compared to steel pipe. By way of example, Aldyl "A" polyethylene piping marketed by DuPont, has a linear coefficient of thermal expansion stated by the manufacturer to be: $9 \times 10^{-5}$ in./in.F.° as compared to $6.5 \times 10^{-6}$ in./in.F.° for steel pipe. Notwithstanding, government agencies regulating installation of such systems require that each joint sustain the longitudinal pullout or thrust forces caused by contraction or expansion of the piping or by anticipated external or internal loading to within prescribed limits. (Title 49, Section 192 "Transportation of Natural and Other Gas by Pipeline—Minimum Safety Regulations"—Fed. Vol. 35 NO 161).

Consequently, where such pipe sections are of plastic composition, they must not only be retained by the coupling in opposition to any longitudinally imposed draw bar forces without literally being torn away, but they must be retained to the extent that failure from these imposed forces will of necessity occur elsewhere in the system removed from the joint. A stab-type coupling for retention of plastic tubing is disclosed for example in prior U.S. Pat. No. 4,229,025.

In addition to the foregoing considerations, each manufacturer of such couplings instinctively strives to reduce product cost by improvements however marginal that result in cost savings in the end-product. While cost saving is a fundamental objective underlying competitive markets, it has generally been unknown how to achieve cost reductions in such couplings while maintaining the reliability of performance required to conform with the regulation standards therefor.

SUMMARY OF THE INVENTION

The invention relates to pipe couplings and more specifically to a novel compression-end type coupling for securing plastic pipe and tubing. Comprising the coupling hereof is a tubular body, preferably of molded plastic composition that includes a counterbore formed in at least one end in which to receive the pipe end of plastic pipe to be coupled. For coupling the received pipe, a flanged tubular stiffner, preferably of steel composition, is seated against the inward radial shoulder of the counterbore, and extends inward of the received pipe end in a slip fit therewith. A spacer retainer ring of plastic composition and generally U-shaped in section, engages the stiffener flange. Juxtaposed axially outward therefrom are a collapsible plastic gripper ring toothed on its inner surface and tapered about its periphery and a plastic locking ring complementary chamferred for effecting a ramping relation therewith. Inward threading of a plastic end nut applies sealing against a contained gasket while forcing and displacing the locking ring axially inward into engagement against the back face of the spacer ring. In the course of its movement, the locking ring ramps over the gripper ring, forcing the latter to collapse inwardly into a controlled grip relation with the pipe end periphery thereat.

Not only does the foregoing arrangement of components achieve an economical construction, but by selecting a predetermined ramping angle and displacement distance incurred by the locking ring, the toothed penetration effected by the gripper ring into the pipe surface can be carefully controlled within pre-determined prescribed limits. Consequently, operability standards can be reliably achieved with a minimum of installation effort in conforming to government regulations applicable thereto.

It is therefore an object of the invention to provide a novel pipe coupling for joining plastic pipe.

It is a further object of the invention to effect the foregoing object in a compression-end type fitting affording economical construction and reliable performance.

BRIEF DESCRIPTION OF THE DRAWING

FIG. 5 is a front elevation of the spacer ring;

FIG. 6 is a sectional view of the spacer retainer ring as taken substantially along the lines 6—6 of FIG. 5;

FIG. 7 is a front elevation of the gripper ring; and

FIG. 8 is a sectional view taken substantially along the lines 8—8 of FIG. 7.

Figure 1:
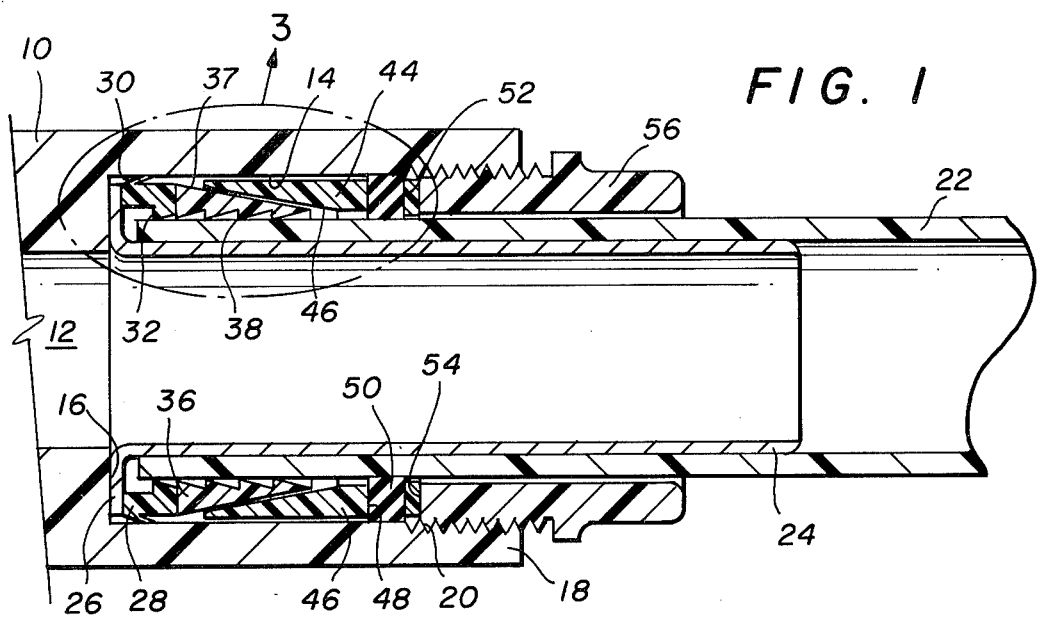
FIG. 1 is a sectional view through one end of a pipe coupling in accordance with the invention with the components arranged in a pre-coupled mode.

Referring now to the drawings, the coupling hereof comprises a tubular body 10, preferably of plastic composition and for purposes hereof has been constructed of glass filled nylon affording a Rockwell M hardness of about 89-112. The body includes a central passage 12 communicating with a counterbore 14 extending from a radial shoulder 16 to an end face 18 and includes internal threads 20. To receive and secure plastic tubing 22 to be coupled there is provided an elongated tubular stiffener 24, preferably of steel and sized to afford an inward slip fit with the pipe end. The stiffener terminates inwardly of the body in an outward flange 26 adapted to seat against shoulder 16.

Engaging the inside face of flange 26 is a spacer retainer ring 28 most completely illustrated in FIGS. 5 and 6, and preferably comprised of plastic having a hardness of about 80 on the Rockwell M scale. The spacer ring is generally U-shaped in cross section and at its inward end (in the direction of assembly) includes outwardly extending tabs 30 adapted to prevent fallout of stiffener 24 during any disassembly by catching in body threads 20. For this purpose, the angle ρ of tab 30 is about 20 degrees. Pre-formed circumferentially about the rear inward face are a plurality of sharp teeth 32 to effect a surface grip of pipe 22. The teeth are inclined horizontally at an angle $\phi$ of about 13 degrees and inclined vertically at an angle $\alpha$ of about 7 degrees. Rear face 34 is adapted to receive the thrust load of assembly as will be understood.

Positioned juxtaposed behind spacer ring 28 is an annular gripper ring 36, most completely illustrated in FIGS. 7 and 8 and likewise preferably of molded plastic composition such as an Acetal copolymer affording a Rockwell M hardness of about 80. The gripper ring is wedge shape in cross-section at its periphery 37 that is frusto-conically tapered to a reduced diameter from left to right. Contained on the inner surface of the gripper ring are a plurality of axially stepped sharp-edged teeth 38 of controlled depth on the order of about 1/32 inches for 1¼ IPS and smaller and about 1/16 in. for 1½ IPS and larger. Enabling inward collapse of the gripper ring in response to a circumferential inwardly applied force are a plurality of uniformly spaced axial slots 40 and 42 alternating about the circumference from the inner and outer radial faces thereof.

Partially overlapping ring 36, with a chamfer complementary to chamfer 37 is an annular locking ring 44 tapered along its inner periphery 46 so as to enable a ramping relation with surface 37 of the gripper ring. Along its outer diameter ring 44 is sized to maintain a concentric radial separation from counterbore surface 14 thereat. Juxtaposed to the back surface 48 of the locking ring is a resilient gasket 50 backed by a thrust washer 52 that is engaged by the front face 54 of a threaded nut 56 of molded plastic composition.

Figure 2:
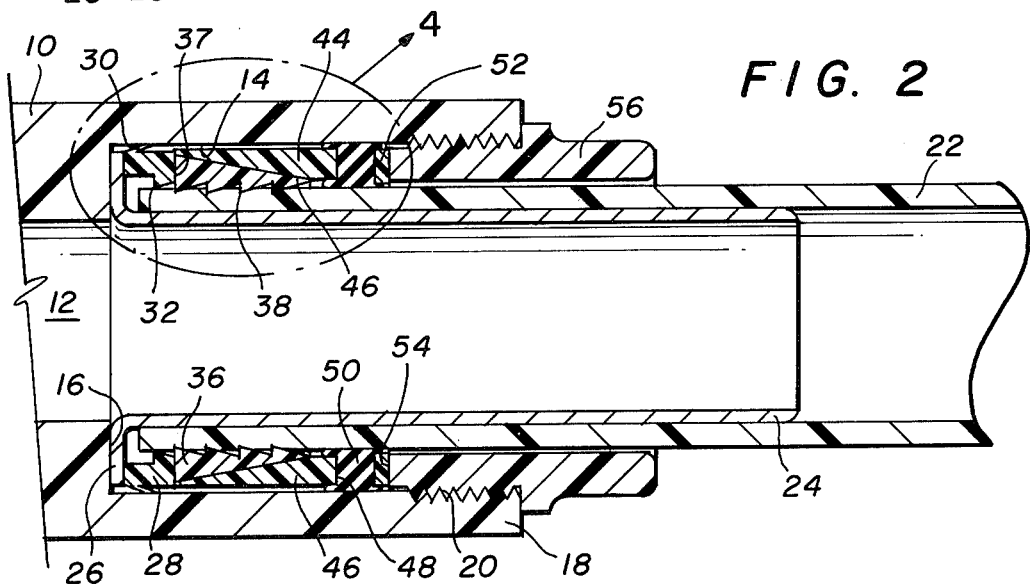
FIG. 2 is a sectional view similar to FIG. 1 for the coupling in its post-coupled mode.
Figure 3:
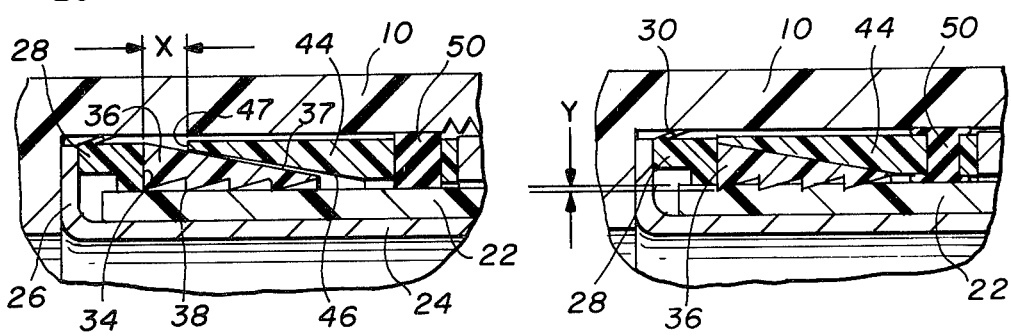
FIGS. 3 and 4 are fragmentary enlargements of the encircled portions 3 and 4 of FIGS. 1 and 2 respectively.
Figure 4:
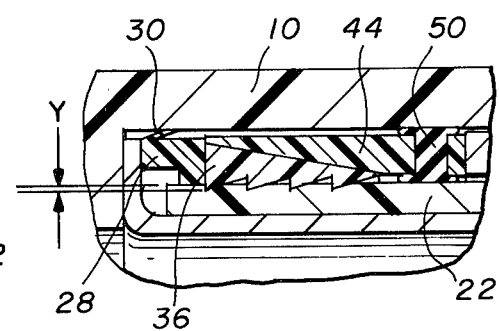

On preliminary assembly, the components are generally contained in the arrangement illustrated in FIG. 1 and when the coupled joint is completed appear like that illustrated in FIG. 2. To effect the coupled relation of FIG. 2, nut 56 is threaded inwardly in the course of which the front end 47 of locking ring 44 is moved leftward a distance X (FIG. 3) until engaging the back surface 34 of spacer retainer ring 28 (FIG. 4). In the course of the latter displacement, internal taper 46 of the locking ring engaging the outer taper 37 of the gripper ring 36 forces the latter in a radially inward collapse for teeth 38 to effect a biting grip in the periphery of the received pipe 22 thereat to a controlled depth Y. Whereas dimension Y can be varied to suit, a penetration depth of about ten percent of the wall thickness of pipe 22 has been found adquate. Typically, pipe 22 would have a Rockwell M hardness of about 50 as compared to the 80 M hardness of teeth 38. Should any pullout forces be subsequently encountered, the radial hoop stress of the gripper ring is totally contained by the locking ring thereby relieving transmittal of stress against the body.

By the above description, there has been disclosed a novel coupling construction for securing plastic pipe in a coupled relation. By virtue of employing relatively simple hardware in a novel combination, cost thereof is maintained to a minimum while reliability of performance exceeds that required by the government regulations affecting such installations. At the same time, installation is relatively simple in that with the components in place, the plastic pipe need only be slip fit over stiffener 24 until bottoming out against the flange 26. Loosely assembled in that manner, the retainer ring 28 should prevent withdrawal and thereafter tightening of nut 56 secures the pipe in a lockgrip retention against pullout. Torquing is largely unnecessary since when end face 47 of the locking ring engages the back face 34 of the spacer ring, the retention force imposed by gripper ring 36 is completed. The seal imposed by gasket 50 is essentially independent from the grip of ring 36 while nut force is not translated into torque transmitted to the received pipe 22.

While the material compositions of the various individual components have been generally indicated they are not intended as a limitation of the invention since obviously substitution of steel or plastic could be made quite readily. Moreover, whereas only one end of body 10 has been illustrated and described, the other end could be similarly adapted or adapted differently as is well known in the art.

Since many changes could be made in the above construction and many apparently widely different embodiments of this embodiment could be made without departing from the scope thereof, it is intended that all matter contained in the drawings and specification should be interpreted as illustrative and not in limiting sense.

The embodiments of the invention in which an exclusive property or privilege is claimed are defined as follows:

1. A pipe coupling for connecting an end portion of non-metallic pipe and comprising in combination:
   (a) a tubular body defining a central flow passage and including a counterbore communicating with said flow passage, said counterbore extending from a shoulder internal of the body to a distal end of the body for receiving the end of non-metallic pipe to be coupled;
   (b) a tubular stiffener within said counterbore having an outwardly extending flange engaging said shoulder and sized to receive the pipe end in a slip fit thereover;
   (c) an annular gripper ring having a toothed inner periphery and a tapered outer periphery arranged to surround the received pipe end and adapted to collapse inwardly in a toothed penetration gripping engagement of the pipe periphery in response to a radially inward force imposed thereon;
   (d) a spacer ring positioned about the received pipe end at an axial location intervening between the inside face of said stiffener flange and said gripper ring;
   (e) a locking ring having a tapered inner surface adapted to surround the tapered outer periphery of said gripper ring and effective when moved axially over said gripper ring in a ramping relation to impose a radial inward force thereon, said locking ring having an outer diameter less than the inner diameter of said counterbore so as to define a radial clearance therebetween and being axially dimensioned for its inward end face to engage and be arrested against further axial movement over said gripper ring by the back face of said spacer ring when a predetermined tooth penetration of said gripper ring into the received pipe end has been achieved;
   (f) gasket means surrounding the received pipe end; and
   (g) nut means operative to thread inwardly of said body to compress said gasket means and displace said locking ring axially over said gripping ring in a ramp forced relation until the inward end face of said locking ring engages the back face of said spacer ring.

2. A pipe coupling according to claim 1 in which said spacer ring includes means operatively effective to prevent fallout of said stiffener in the event of coupling disassembly.

3. A pipe coupling according to claim 1 in which said gripper ring includes at least one axial slot defined in its periphery to enhance inward collapse in response to the radially inward force imposed thereon.

* * * * *